Feb. 16, 1926.

A. DUMONT

VALVE

Filed Feb. 4, 1925

1,573,688

Albert Dumont,
INVENTOR

BY Victor J. Evans,
ATTORNEY

WITNESS:

Patented Feb. 16, 1926.

1,573,688

UNITED STATES PATENT OFFICE.

ALBERT DUMONT, OF MAPLE CITY, MICHIGAN.

VALVE.

Application filed February 4, 1925. Serial No. 6,840.

*To all whom it may concern:*

Be it known that I, ALBERT DUMONT, a citizen of the United States, residing at Maple City, in the county of Leelanau and State of Michigan, have invented new and useful Improvements in Valves, of which the following is a specification.

This invention relates to improvements in valve mechanisms especially adapted for toilet flushing tanks and the like, an object being to provide a valve which will effectually prevent leakage of water through the discharge port of the tank and which may be readily opened and automatically closed.

Another object of the invention is the provision of means for automatically opening the valve when water within the tank reaches a predetermined level and thus prevent overflow of the tank.

Another object of the invention is the provision of a valve mechanism which in addition to the above and other advantages, is simple in construction, efficient in use and in which access may be readily had to the various parts for adjustment and repair.

With the above and other objects in view, the invention further includes the following novel features and details of construction, to be hereinafter more fully described and illustrated in the accompanying drawings and pointed out in the appended claims.

In the drawings:—

Figure 1:
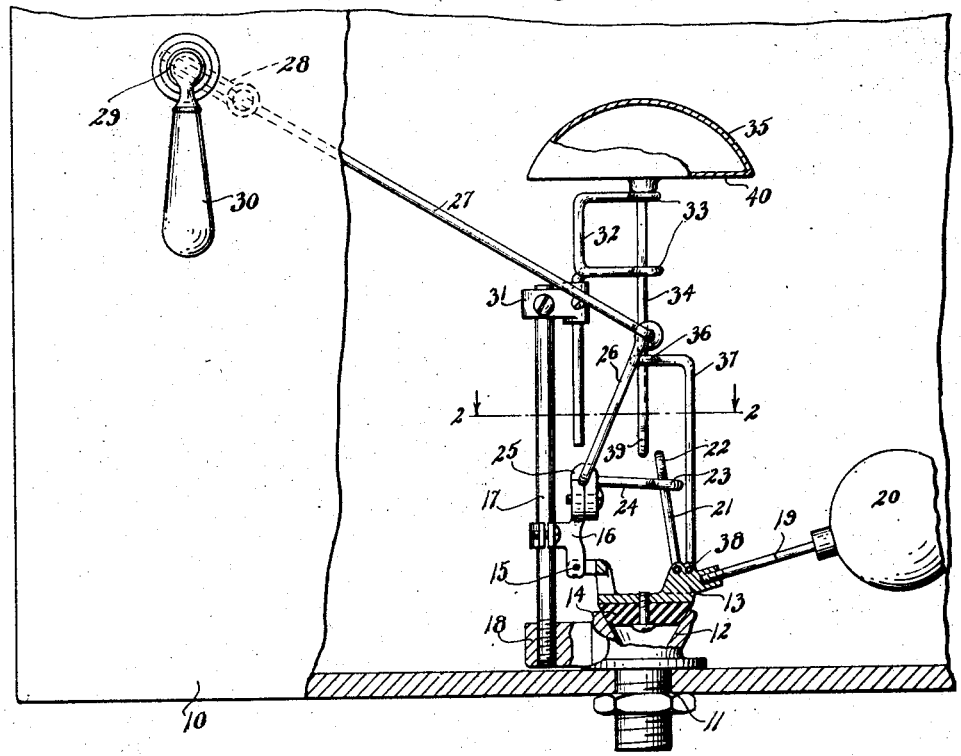
Figure 1 is an elevation partly in section showing a portion of a tank or container with the invention in position for use.
Figure 2:
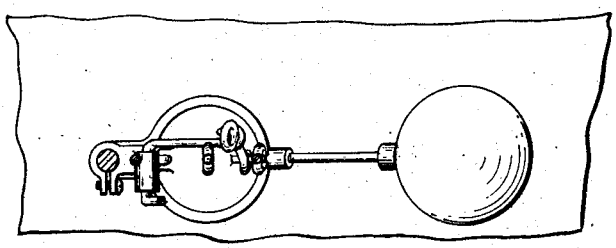
Figure 2 is a section on the line 2—2 of Figure 1.

Referring in detail to the drawings wherein like characters of reference denote corresponding parts, the reference character 10 indicates a portion of a container such as the usual flushing tank, the latter being provided with an outlet opening in which is secured a fitting 11. The inner end of this fitting is provided with an extension, the bore of which is outwardly flared so as to provide an annular inclined valve seat 12 through which the tank is discharged and which is controlled by a valve 13. This valve is provided with a rubber or other compressible disk 14 which is beveled to engage the valve seat 12 and is hingedly secured as indicated at 15 to a bracket 16 carried by a rod 17, the latter being secured within a lug 18 which extends from the fitting 11.

Extending from the valve 13 is an arm 19 at the outer end of which there is secured a weight 20, the latter acting to automatically close the valve and hold the same in closed position. Also extending from the valve 13 is an arm 21 whose outer end is provided with an eye or enlargement 22. This arm passes through an eye 23 carried at one end of one arm 24 of a bell crank lever, the latter being mounted for pivotal movement in an extension 25 of the bracket 16. The other arm 26 of the bell crank lever has secured thereto one end of a rod 27 and the opposite end of this rod is secured to an arm 28 which is rigid with the inner end of a short shaft 29 mounted in a suitable bearing plate which extends through one wall of the container 10. The outer end of the shaft 29 is provided with an operating handle 30.

Through the medium of the handle 30, the shaft 29 may be rocked so as to move the bell crank lever pivotally through the connecting rod 27. This movement will lift the valve 13 so as to permit of the discharge of water from the container and when the operating handle 30 is released the valve will be automatically seated under the action of the weight 20.

Secured to a bracket 31 carried by the rod 17 is a guide 32. This guide is provided with spaced eyes 33 through which slides the stem 34 of a float 35. The stem 34 is also slidable through an eye 36 carried at the upper end of an arm 37, the latter being pivotally connected to the valve 13 as indicated at 38. The lower end of the rod 34 is provided with an eye or enlargement 39.

When the valve 13 is opened in the manner just described, the arm 37 will slide along the stem 34 without interfering with the operation of the valve or causing any movement of the float 35. Should water within the tank or container rise above the lower flat face 40 of the float 35, the latter will be lifted until the enlargement 39 engages the eye 36 of the arm 37, whereupon continued upward movement of the float will open the valve 13 and permit a sufficient amount of water to escape through the discharge opening and prevent overflow of the tank.

The invention is susceptible of various changes in its form, proportions and minor details of construction and the right is herein reserved to make such changes as properly fall within the scope of the appended claims.

Having described the invention what is claimed is:—

1. The combination with a container having a discharge outlet, a normally closed valve for controlling the outlet, manually operated means to open the valve, a vertically movable stem, a guide for the stem, a float carried by the stem and a link having one end pivotally connected to the valve and its opposite end slidingly connected with said stem to open the valve when liquid within the container reaches a predetermined level.

2. The combination with a container having a discharge outlet, a pivotally mounted normally closed weighted valve for controlling the outlet, a pivotally mounted bell crank lever, means to move the lever pivotally, means connecting the lever and valve to open the valve when the bell crank lever is operated and permit said valve to open independent of the movement of the bell crank lever and float operated means connected to the valve to open the latter when liquid within the container reaches a predetermined level.

In testimony whereof I affix my signature.

ALBERT DUMONT.